(No Model.)
T. C. ZETZSCHE.
FURNACE.
No. 305,650. Patented Sept. 23, 1884.
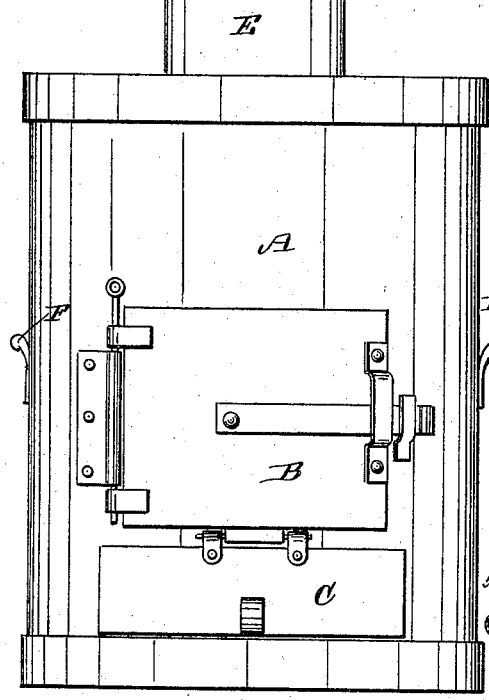
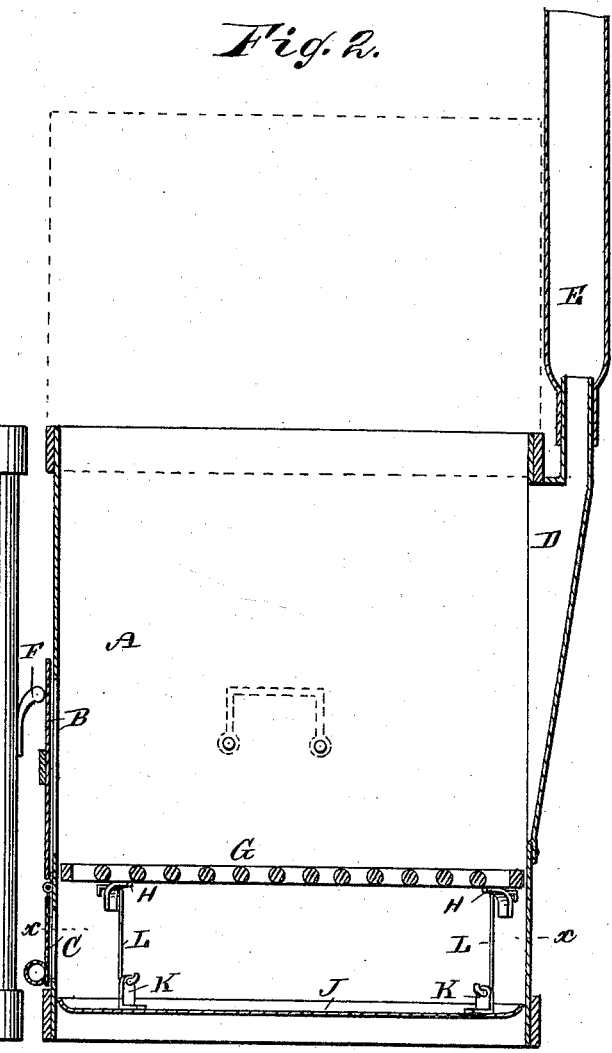
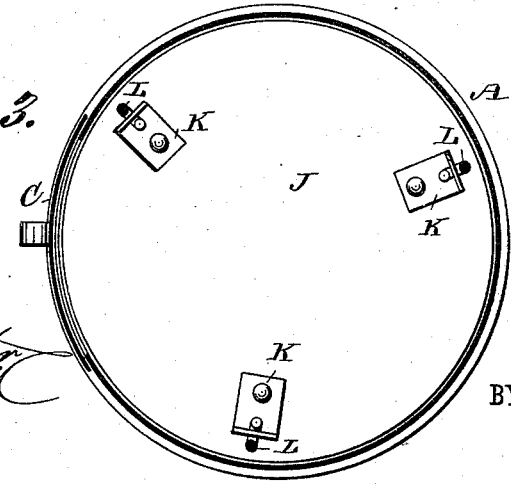
WITNESSES:
INVENTOR:
T. C. Zetzsche
BY Munn & Co
ATTORNEYS.

UNITED STATES PATENT OFFICE.

THOMAS C. ZETZSCHE, OF OKAWVILLE, ILLINOIS, ASSIGNOR TO HIMSELF AND JULIUS F. ZETZSCHE, OF SAME PLACE.

FURNACE.

SPECIFICATION forming part of Letters Patent No. 305,650, dated September 23, 1884.

Application filed February 12, 1884. (No model.)

*To all whom it may concern:*

Be it known that I, THOMAS C. ZETZSCHE, of Okawville, in the county of Washington and State of Illinois, have invented a new and Improved Furnace, of which the following is a full, clear, and exact description.

The object of my invention is to provide a new and improved furnace for heating the contents of kettles, caldrons, &c., which furnace is very simple in construction and saves fuel.

The invention consists in the combination, with a cylindrical casing, of lugs projecting from the inner surface for the purpose of supporting the grate, and of an ash-pan suspended by hook-rods from the lugs supporting the grate.

Reference is to be had to the accompanying drawings, forming part of this specification, in which similar letters of reference indicate corresponding parts in all the figures.

Figure 1 is a front view of my improved furnace. Fig. 2 is a vertical sectional elevation of the same. Fig. 3 is a sectional plan view of the same on the line *x x*, Fig. 2.

The furnace consists of a sheet-iron cylindrical casing, A, provided with the fire-place door B, the ash-pit door C, and the flattened neck or tubular projection D, which extends above the upper edge of the casing, and over which tubular projection the lower end of the stove-pipe E is passed. The casing is provided with two handles, F, for lifting and carrying it. The removable grate G, which is made of cast-iron, rests on inwardly-projecting angular lugs H, riveted to the inner surface of the casing. The circular ash-pan J is provided with upwardly-projecting lugs K, through apertures in which the lower hook ends of rods L are passed, the upper hook ends of the said rods being passed over the angular lugs H, so that the ash-pan will be suspended from the lugs H. The ash-pan can easily be removed. The kettle is placed on the top of the furnace, thus closing the top and retaining all heat in the casing.

Having thus described my invention, I claim as new and desire to secure by Letters Patent—

1. In a furnace, the combination, with a sheet-iron casing, of angle-lugs projecting from the inner surface, for the purpose of supporting the grate, and of an ash-pan suspended from the said lugs, substantially as herein shown and described.

2. In a furnace, the combination, with the sheet-iron casing A, of the angle-lugs H, projecting from the inner surface, the grate G, resting on the said angle-lugs, the ash-pan provided with upwardly-projecting apertured lugs K, and the hook-rods L, having their lower hooks passed through the apertures in the lugs K, and having their upper hook ends passed over the angle-lugs H, substantially as herein shown and described.

THOMAS C. ZETZSCHE.

Witnesses:
JOHN F. FRANK,
WILLIS F. ZETZSCHE.